US012499199B2

(12) United States Patent
Klein et al.

(10) Patent No.: US 12,499,199 B2
(45) Date of Patent: Dec. 16, 2025

(54) USING PERSONAL ATTRIBUTES TO UNIQUELY IDENTIFY INDIVIDUALS

(71) Applicant: Google LLC, Mountain View, CA (US)

(72) Inventors: Daniel V. Klein, Pittsburgh, PA (US); Ramprasad Sedouram, Karnataka (IN)

(73) Assignee: Google LLC, Mountain View, CA (US)

( * ) Notice: Subject to any disclaimer, the term of this patent is extended or adjusted under 35 U.S.C. 154(b) by 169 days.

(21) Appl. No.: 18/363,840

(22) Filed: Aug. 2, 2023

(65) Prior Publication Data

US 2025/0045367 A1 Feb. 6, 2025

(51) Int. Cl.
*G06F 21/32* (2013.01)
*G06V 40/16* (2022.01)
*G10L 17/00* (2013.01)

(52) U.S. Cl.
CPC ............ *G06F 21/32* (2013.01); *G06V 40/172* (2022.01); *G10L 17/00* (2013.01)

(58) Field of Classification Search
CPC ...... G06F 21/32; G06V 40/172; G06V 40/50; G06V 40/70; G10L 17/00; G10L 17/02; G10L 17/10; H04L 63/0861
USPC ........................................................ 340/5.82
See application file for complete search history.

(56) References Cited

U.S. PATENT DOCUMENTS

| 9,558,415 | B2* | 1/2017 | Paul | G06F 21/32 |
| 10,409,382 | B2* | 9/2019 | Yamamoto | G06V 40/113 |
| 10,438,428 | B2* | 10/2019 | Rettig | H04W 48/04 |
| 10,558,272 | B2* | 2/2020 | Parshionikar | G06V 40/20 |
| 11,487,812 | B2* | 11/2022 | Bataller | G06F 16/5838 |
| 11,803,831 | B1* | 10/2023 | Kalaboukis | G06Q 20/405 |
| 2015/0098631 | A1* | 4/2015 | Palmer | G06V 40/172 |
| | | | | 382/118 |
| 2017/0236002 | A1* | 8/2017 | Oh | G06V 40/171 |
| | | | | 382/118 |
| 2018/0232201 | A1* | 8/2018 | Holtmann | H04N 23/611 |
| 2019/0098003 | A1* | 3/2019 | Ota | H04L 63/12 |

(Continued)

OTHER PUBLICATIONS

International Search Report and Written Opinion issued in related PCT Application No. PCT/US2024/039367, dated Oct. 15, 2024.

*Primary Examiner* — Nam V Nguyen
(74) *Attorney, Agent, or Firm* — Honigman LLP; Brett A. Krueger; Grant Griffith

(57) ABSTRACT

A method includes processing, using a speech recognizer, a first portion of audio data to generate a first lattice, and generating a first partial transcription for an utterance based on the first lattice. The method includes processing, using the recognizer, a second portion of the data to generate, based on the first lattice, a second lattice representing a plurality of partial speech recognition hypotheses for the utterance and a plurality of corresponding speech recognition scores. For each particular partial speech recognition hypothesis, the method includes generating a corresponding re-ranked score based on the corresponding speech recognition score and whether the particular partial speech recognition hypothesis shares a prefix with the first partial transcription. The method includes generating a second partial transcription for the utterance by selecting the partial speech recognition hypothesis of the second plurality of partial speech recognition hypotheses having the highest corresponding re-ranked score.

20 Claims, 5 Drawing Sheets

(56) References Cited

U.S. PATENT DOCUMENTS

2021/0034898 A1   2/2021   Cai et al.
2022/0027625 A1   1/2022   Brake et al.

* cited by examiner

USING PERSONAL ATTRIBUTES TO UNIQUELY IDENTIFY INDIVIDUALS

TECHNICAL FIELD

This disclosure relates to using personal attributes to uniquely identify individuals.

BACKGROUND

An important aspect of human-to-human interactions is the ability of a person to identify an individual with which the person is interacting. By identifying the individual the person may better comprehend what the individual is communicating and/or communicate more effectively with the individual. A person may identify an individual using their auditory and/or visual faculties.

SUMMARY

One aspect of the disclosure provides a computer-implemented method executed on data processing hardware that causes the data processing hardware to perform operations including, for a particular person: receiving personal attribute data characterizing one or more personal attributes of the particular person, the personal attribute data captured by a device associated with a user while the user is interacting with the particular person; obtaining an identity of the particular person; extracting, from the personal attribute data, a reference vector for the particular person; and storing, in an identifiable persons datastore, the reference vector for the particular person and the identity of the particular person. The operations include receiving additional personal attribute data characterizing one or more personal attributes of an unrecognizable individual who the user is unable to recognize, the additional personal attribute data obtained by the device while the user is interacting with the unrecognizable individual. The operations include performing person identification on the additional personal attribute data to identify the unrecognizable individual by: extracting, from the additional personal attribute data, an evaluation vector for the unrecognizable individual; determining that the evaluation vector for the unrecognizable individual matches the reference vector stored in the identifiable persons datastore; and based on determining that the evaluation vector for the unrecognizable individual matches the reference vector stored in the identifiable persons datastore, identifying the unrecognizable individual as the particular person. The operations include presenting, while the user is interacting with the unrecognizable individual, an identification cue to the user, the identification cue conveying the identity of the unrecognizable individual as the particular person.

Implementations of the disclosure may include one or more of the following optional features. In some implementations, the personal attribute data includes at least one of audio data characterizing to an utterance spoken by the particular person, the audio data captured by an array of one or more microphones in communication with the device, or image data characterizing a face or other identifiable aspect (e.g., a tattoo) of the particular person, the image data captured by an image capture device in communication with the device. In some examples, receiving the personal attribute data includes receiving audio data characterizing an utterance spoken by the particular person during the interaction the user is having with the particular person; extracting the reference vector for the particular person includes extracting, from the audio data characterizing the utterance spoken by the particular person, the reference vector representing characteristics of a voice of the particular person; receiving the additional personal attribute data includes receiving additional audio data characterizing an utterance spoken by the unrecognizable individual during the interaction the user is having with the unrecognizable individual; and extracting the evaluation vector for the unrecognizable individual includes extracting, from the additional audio data corresponding to the utterance spoken by the unrecognizable individual, the evaluation vector representing characteristics of a voice of the unrecognizable individual. In other examples, receiving the personal attribute data includes receiving image data corresponding to a face of the particular person during the interaction the user is having with the particular person; extracting the reference vector for the particular person includes extracting, from the image data characterizing the face of the particular person, the reference vector representing facial features of the particular person; receiving the additional personal attribute data includes receiving additional image data characterizing a face of the unrecognizable individual during the interaction the user is having with the unrecognizable individual; and extracting the evaluation vector for the unrecognizable individual includes extracting, from the additional image data characterizing the face of the unrecognizable individual, the evaluation vector representing facial features of the unrecognizable individual.

In some implementations, obtaining the identity of the particular person includes receiving a user input from the user that conveys the identity of the particular person, the user providing the user input after the user finishes the interaction with the particular person. Alternatively, obtaining the identity of the particular person includes: receiving audio data characterizing an utterance spoken by the particular person during the interaction the user is having with the particular person, performing speech recognition on the audio data to obtain a transcription of the utterance spoken by the particular person, and processing the transcription of the utterance to ascertain the identity of the particular person. Alternatively, obtaining the identity of the particular person includes receiving, from another computing device associated with the particular person, metadata indicating the identity of the particular person from the another computing device.

In some examples, the operations include receiving a trigger input from the user, and performing the person identification on the additional personal attribute data to identify the unrecognizable individual in response to receiving the trigger input. Here, the trigger input may be at least one of a voice-based command or a gesture captured by the device. In some implementations, presenting the identification cue to the user includes providing, for audible output from the device or from an audio output device in communication with the device, an audio message conveying the identity of the unrecognizable individual. Alternatively, presenting the identification cue to the user includes providing, for display on a screen in communication with the device, a textual message conveying the identity of the unrecognizable individual.

Another aspect of the disclosure provides a system including data processing hardware, and memory hardware in communication with the data processing hardware and storing instructions that, when executed on the data processing hardware, causes the system to perform operations. The operations including for a particular person: receiving personal attribute data characterizing one or more personal attributes of the particular person, the personal attribute data captured by a device associated with a user while the user is interacting with the particular person; obtaining an identity of the particular person; extracting, from the personal attribute data, a reference vector for the particular person; and storing, in an identifiable persons datastore, the reference vector for the particular person and the identity of the particular person. The operations include receiving additional personal attribute data characterizing one or more personal attributes of an unrecognizable individual who the user is unable to recognize, the additional personal attribute data obtained by the device while the user is interacting with the unrecognizable individual. The operations include performing person identification on the additional personal attribute data to identify the unrecognizable individual by: extracting, from the additional personal attribute data, an evaluation vector for the unrecognizable individual; determining that the evaluation vector for the unrecognizable individual matches the reference vector stored in the identifiable persons datastore; and based on determining that the evaluation vector for the unrecognizable individual matches the reference vector stored in the identifiable persons datastore, identifying the unrecognizable individual as the particular person. The operations include presenting, while the user is interacting with the unrecognizable individual, an identification cue to the user, the identification cue conveying the identity of the unrecognizable individual as the particular person.

Implementations of the disclosure may include one or more of the following optional features. In some implementations, the personal attribute data includes at least one of audio data characterizing to an utterance spoken by the particular person, the audio data captured by an array of one or more microphones in communication with the device, or image data characterizing a face of the particular person, the image data captured by an image capture device in communication with the device. In some examples, receiving the personal attribute data includes receiving audio data characterizing an utterance spoken by the particular person during the interaction the user is having with the particular person; extracting the reference vector for the particular person includes extracting, from the audio data characterizing the utterance spoken by the particular person, the reference vector representing characteristics of a voice of the particular person; receiving the additional personal attribute data includes receiving additional audio data characterizing an utterance spoken by the unrecognizable individual during the interaction the user is having with the unrecognizable individual; and extracting the evaluation vector for the unrecognizable individual includes extracting, from the additional audio data corresponding to the utterance spoken by the unrecognizable individual, the evaluation vector representing characteristics of a voice of the unrecognizable individual. In other examples, receiving the personal attribute data includes receiving image data corresponding to a face of the particular person during the interaction the user is having with the particular person; extracting the reference vector for the particular person includes extracting, from the image data characterizing the face of the particular person, the reference vector representing facial features of the particular person; receiving the additional personal attribute data includes receiving additional image data characterizing a face of the unrecognizable individual during the interaction the user is having with the unrecognizable individual; and extracting the evaluation vector for the unrecognizable individual includes extracting, from the additional image data characterizing the face of the unrecognizable individual, the evaluation vector representing facial features of the unrecognizable individual.

In some implementations, obtaining the identity of the particular person includes receiving a user input from the user that conveys the identity of the particular person, the user providing the user input after the user finishes the interaction with the particular person. Alternatively, obtaining the identity of the particular person includes: receiving audio data characterizing an utterance spoken by the particular person during the interaction the user is having with the particular person, performing speech recognition on the audio data to obtain a transcription of the utterance spoken by the particular person, and processing the transcription of the utterance to ascertain the identity of the particular person. Alternatively, obtaining the identity of the particular person includes receiving, from another computing device associated with the particular person, metadata indicating the identity of the particular person from the another computing device.

In some examples, the operations include receiving a trigger input from the user, and performing the person identification on the additional personal attribute data to identify the unrecognizable individual in response to receiving the trigger input. Here, the trigger input may be at least one of a voice-based command or a gesture captured by the device. In some implementations, presenting the identification cue to the user includes providing, for audible output from the device or from an audio output device in communication with the device, an audio message conveying the identity of the unrecognizable individual. Alternatively, presenting the identification cue to the user includes providing, for display on a screen in communication with the device, a textual message conveying the identity of the unrecognizable individual.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

An important aspect of human-to-human interactions is the ability of a person to identify an individual with which the person is interacting. By identifying the individual the person may better comprehend what the individual is communicating and/or communicate more effectively with the individual. A person may identify an individual using their auditory and/or visual faculties. However, some persons have physical, neurological and/or cognitive challenges that make it difficult to accurately identify individuals. For example, a person may have vision deficits (e.g., poor eyesight or blindness), prosopagnosia (also referred to as face blindness that impairs face recognition even with adequate eyesight), auditory deficits (e.g., deafness or other hearing impairments), etc. that limit the person's ability to identify an individual with which they are communicating. Therefore, there is a need for systems and methods that can use personal attributes to uniquely identify individuals on behalf of a person.

Figure 1:
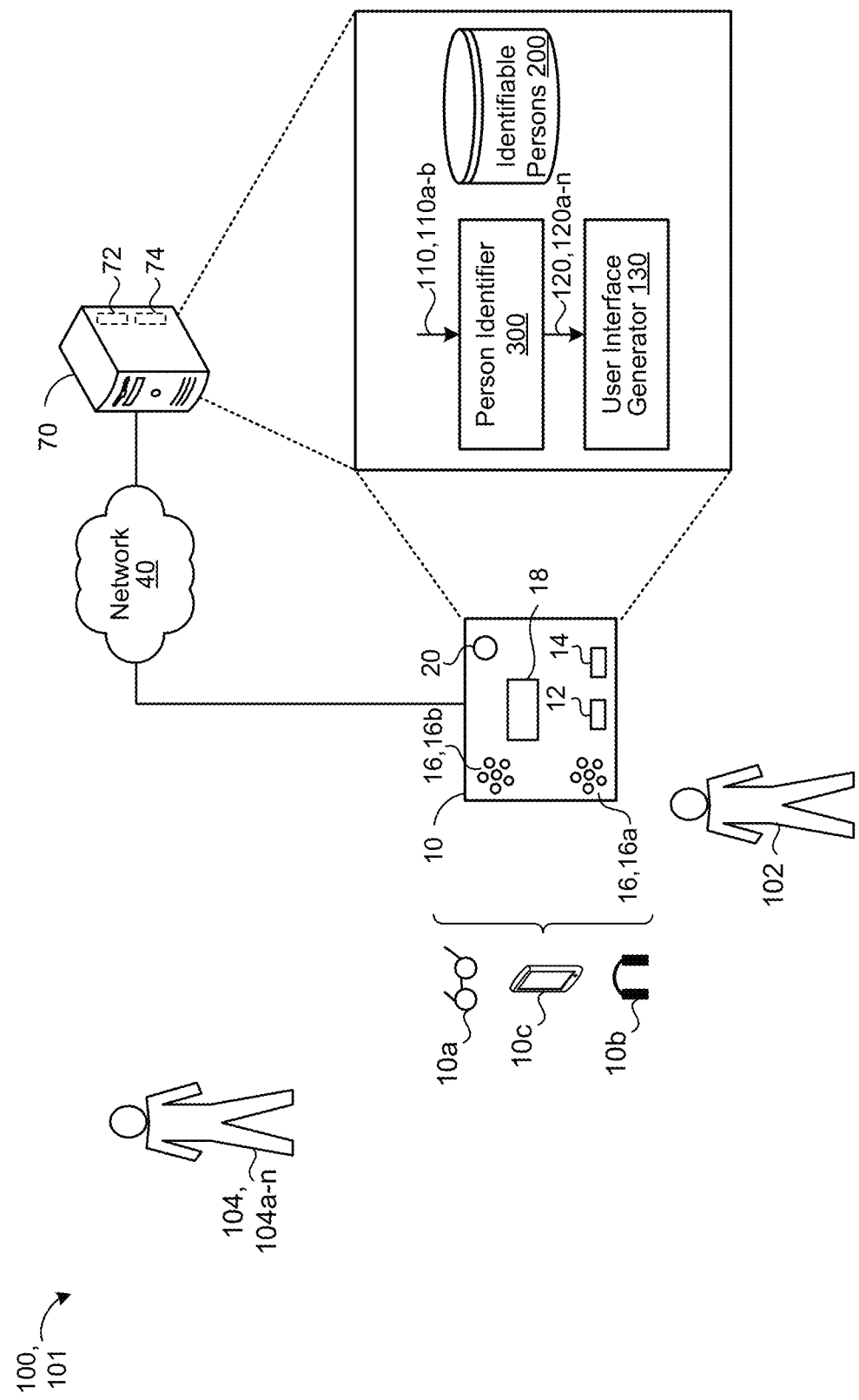
FIG. 1 is a schematic view of an example system for using personal attributes to uniquely identify individuals.

FIG. 1 is a schematic view of an example of a system 100 and a person 102 interacting in an environment 101 with one or more individuals 104, 104a-n who the person 102 may not be able to recognize (also referred to generally as unrecognizable individuals 104). As used herein, an unrecognizable individual 104 is unrecognizable from the perspective of the person 102, but may be recognizable by other persons. The person 102 (also referred to generally as a user 102) uses and interacts with a user device 10 (also referred to generally as a device 10). The device 10 may be, may be part of, or may be in communication with any number of devices 10a-n. The device 10 performs person identification on behalf of the user 102, and presents visual and/or auditory cues to the user 102 that indicate the identification of an unrecognizable individual 104. Additionally or alternatively, a remote computing system 70 (e.g., one or more remote servers of a distributed system executing in a cloud-computing environment) in communication with the device 10 via a network 40 performs person identification on behalf of the user 102. Here, person identification may include facial recognition and/or speaker identification.

In some examples, the device 10 includes, is part of, or is in communication with an augmented reality (AR) headset device 10a (e.g., glasses or goggles). Here, the AR headset device 10a may capture personal attribute data 110 characterizing one or more personal attributes of an unrecognizable individual 104 in the environment 101. As used herein, personal attribute data 110 may include audio data 110a characterizing an utterance spoken by an unrecognizable individual 104 and/or image data 110b characterizing a face of an unrecognizable individual 104. Audio data 110a may be captured by an array of one or more microphones 16a of or in communication with the device 10, and image data 110b may be captured by an image capture device 20 of or in communication with the device 10. Here, the audio data 110a and image data 110b may be captured within the environment 101. Alternatively, the audio data 110a and image data 110b may represent a communication session (e.g., a call or video conference) between the user 102 and the unrecognizable individual 104. The audio data 110a and image data 110b may represent publicly available audio/video such as a YouTube (or other) video, audio/video of a presentation or lecture, audio/video of a broadcast show, etc. The device 10 may process the captured personal attribute data 110 (i.e., audio data and/or image data) to identify the unrecognizable individual 104 as a particular person. The particular person may correspond to an individual known to the user such as an individual the user 102 has previously interacted with but is no longer able to recognize. The AR headset 10a and/or the device 10 may then present one or more identification cues 120, 120a-n (e.g., display visual identification cues 120a and/or output auditory identification cues 120b) conveying the identity of the unrecognizable individual 104 as the particular person to the user 102. For example, visual identification cues 120a may be overlaid on an image of the environment 101 presented to the user 102 by the AR headset 10a, visual identification cues 120a may be presented on a screen 18 of the device 10, and/or the AR headset 10a or the device 10 may audibly output auditory identification cues 120b. In some implementations, when an identified unrecognizable individual 104 is one of many persons in the environment 101, an identification cue 120 may including highlighting, circling, or otherwise designating the identified unrecognizable individual 104.

Additionally or alternatively, the device 10 may include, be part of, or be in communication with an audio headset (e.g., headphones, earbuds, etc.) 10b having one or more microphones 16a and audio output device (e.g., speaker) 16b. Here, the headset 10b may capture the personal attribute data 110 characterizing one or more personal attributes of an unrecognizable individual 104. The device 10 may process the captured personal attribute data 110 (i.e., audio data) to identify an unrecognizable individual 104 as a particular person. The headset 10b and/or the device 10 may then present one or more identification cues 120 (e.g., display visual identification cues 120a and/or output auditory identification cues 120b) conveying the identity of the unrecognizable individual 104 as the particular person to the user 102. For example, visual identification cues 120a may be presented on a screen 18 of the device 10, and/or the headset 10b or the device 10 may audibly output auditory identification cues 120b from the audio output device 16b.

Additionally or alternatively, the device 10 may include a smart phone or tablet 10c having an image capture device (e.g., camera) 20 and/or an audio system 16 with one or more audio capture devices 16, 16a (e.g., microphones) for capturing and converting audio within the environment 101 into electrical signals for capturing personal attribute data 110 characterizing one or more personal attributes of an unrecognizable individual 104 in the environment 101. Here, the personal attribute data 110 may be image data and/or audio data representing the environment 101 of the device 10c. The device 10c may process the captured personal attribute data 110 to identify the unrecognizable individual 104 in the environment 101 as a particular person. The device 10c may then present one or more identification cues 120 (e.g., display visual identification cues 120a and/or output auditory identification cues 120b) conveying the identity of the unrecognizable individual 104 as the particular person to the user 102. For example, visual identification cues 120a may be presented on the screen 18 of the device 10c (e.g., as a textual message conveying the identity of the unrecognizable individual 104 as the particular person), and/or the device 10c may audibly output auditory identification cues 120b (e.g., as an audio message conveying the identity of the unrecognizable individual 104 as the particular person).

Other example devices 10 include, but are not limited to, laptops, computers, wearable devices (e.g., smart watches), smart appliances, internet of things (IoT) devices, vehicle infotainment systems, smart displays, smart speakers, etc. The device 10 includes data processing hardware 12 and memory hardware 14 in communication with the data processing hardware 12 and stores instructions, that when executed by the data processing hardware 12, cause the data processing hardware 12 to perform one or more operations. In some examples, one or more audio capture devices 16a do not physically reside on the device 10, but are in communication with the audio system 16. In some examples, one or more audio output devices 16b do not physically reside on the device 10, but are in communication with the audio system 16. The remote computing system 70 includes data processing hardware 72, and memory hardware 74 in communication with the data processing hardware 72. The memory hardware 74 stores instructions that, when executed by the data processing hardware 72, cause the data processing hardware 72 to perform one or more operations, such as those disclosed herein.

The device 10 and/or the remote computing system 70 include a person identifier 300. The person identifier 300 receives personal attribute data 110 characterizing one or more personal attributes of an unrecognizable individual 104 obtained by the device 10 while the user 102 is interacting with the unrecognizable individual 104. The person identifier 300 performs person identification on the personal attribute data 110 to identify the unrecognizable individual 104 as a particular person. The person identifier 300 then presents, while the user 102 is interacting with the unrecognizable individual 104, one or more identification cues 120 to the user 102, the one or more identification cues 120 conveying the identity of the unrecognizable individual 104 as the particular person. Here, the identification cues 120 may be visual identification cues and/or audible identification cues.

In some examples, the person identifier 300 receives personal attribute data 110 communicated from a device (e.g., smart phone, wearable, etc.,) associated with the unrecognizable individual 104 that conveys the identity of the unrecognizable individual 104. For instance, with consent of both the user 102 and unrecognizable individual 104 that may be revoked at any time by either one of the user 102 or the unrecognizable individual 104, the device of the individual 104 may pair with the user device 10 and communicate personal attribute data 104 that may simply indicate the name of the individual 104 and/or other information associated with a profile of the individual 104.

The person identifier 300 may perform person identification for identifying unrecognizable individuals 104 by performing facial recognition on received personal attribute data 110 and attempting to uniquely identify an unrecognizable individual 104 as a particular person based on the facial recognition performed. Additionally or alternatively, the person identifier 300 may perform person identification for identifying an unrecognizable individual 104 by performing speaker identification and attempting to uniquely identify an unrecognizable individual 104 as a particular person based on the speaker identification performed. Notably, the person identifier 300 may use any combination of techniques to obtain results that may be correlated to identify different unrecognizable individuals 104 within the environment 101. In some implementations, the person identifier 300 resolves an identity of an unrecognizable individual 104 from a plurality of persons 202 represented in an identifiable persons datastore 200 (see FIG. 2). In some implementations, the person identifier 300 performs person identification of an unrecognizable individual 104 in response to the receipt of a trigger input from the user 102. Example triggers that may be received include, but are not limited to, a voice-based command (e.g., the user 102 saying "hey computer, who is that?" or "umm") or a gesture (e.g., the user 102 raising their eyebrows, closing a fist, rubbing the device 10, etc.) captured by the device 10.

The device 10 and/or the remote computing system 70 also executes a user interface generator 130 configured to present, display or output identification cues 120 to the user 102 of the device 10 while the user 102 is interacting with the unrecognizable individual 104. For example, visual identification cues 120 may be visually displayed on the screen 18, and/or in an AR environment presented by the AR headset 10a worn by the user 102. Audible identification cues 120 may, for example, be audibly output by the audio output device(s) 16b or the headset 10b. In some examples, the identification cues 120 are presented once during an interaction with the unrecognizable individual 104. Alternatively, the identification cues 120 may be initially presented and then represented at a later time if the interaction exceeds a threshold length. Representing the identification cues 120 may be useful for persons with anomic aphasia or anomia who are prone to forgetting who they are interacting with. In some implementations, the user interface generator 130 may present context for the unrecognizable individual 104 by matching the unrecognizable individual 104 with, for example, contact information on the device 10 for the unrecognizable individual 104, or previous communications (e.g., email, text messages, voicemails, etc.) with the unrecognizable individual 104. For example, the user interface generator 130 may present "This is Bob Nelson, who sent you a message about the house near the beach for sale at a discounted price."

Because the user 102 may be reluctant to look away from the unrecognizable individual's eyes to view the visual identity cues 120, because this may make the unrecognizable individual 104 recognize the user's inability to recognize them or/and leading to potential judgements, the user interface generator 103 may present the visual identity cues 120 as audible identity cues 120, may present the visual identity cues 120 when the user 102 looks at another object like a table's surface or a white wall or on another device of the user 102. In some implementations, the device 10 may cause another device associated with an unrecognized individual 104 to display a message indicating that the user 102 has a neurological condition (e.g., prosopagnosia) that may impair their ability to recognize the unrecognized individual 104.

Figure 2:
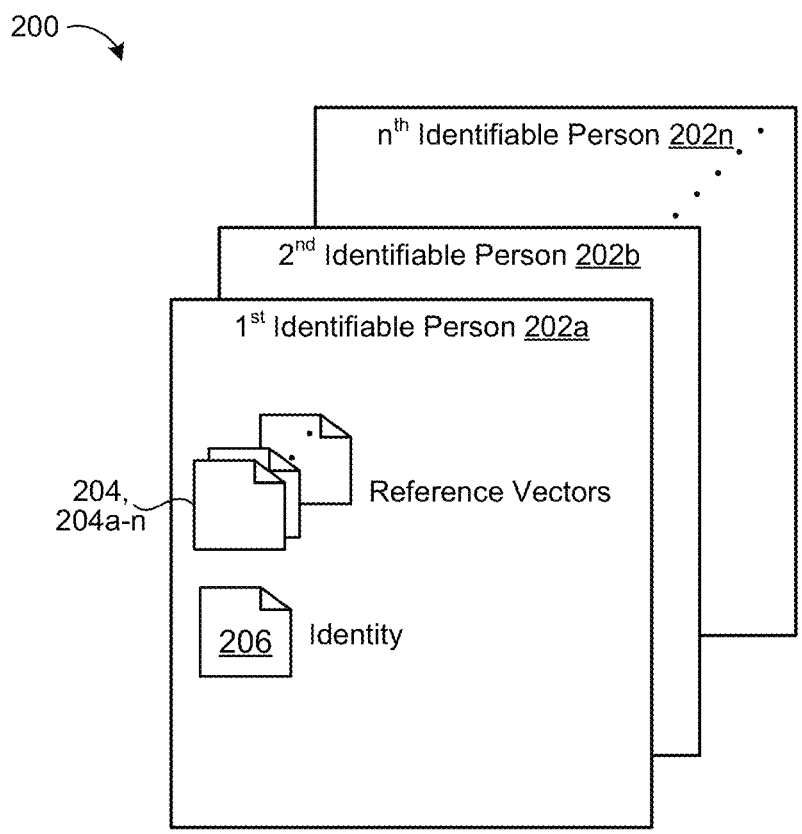
FIG. 2 is a schematic view of an example identifiable persons datastore.

FIG. 2 shows an example identifiable persons datastore 200 storing a plurality of records 202, 202a-n for corresponding ones of a plurality of identifiable persons 202. The user 102 may undertake an enrollment process for an identifiable particular person 202 by creating one or more corresponding reference vectors 204, 204a-n, and providing a corresponding identity 206 of the particular person 202. The person identifier 300 receives personal attribute data 110 characterizing one or more personal attributes of the particular person 202. Here, the personal attribute data 110 may be captured by the device 10 associated with the user 102 while the user 102 is interacting with the particular person 202. The person identifier 300 generates one or more reference vectors 204 from the personal attribute data 110 for the particular person 202, and stores the one or more reference vectors 204 in the identifiable persons datastore 200. Here, the attribute data 110 may be audio data of one or more phrases spoken by the particular person 202 and/or image data of the environment 101 that includes the particular person 202. For example, a person discriminating model 310 (FIG. 3) may extract the one or more reference vectors 204 for the particular person 202 from the personal attribute data 110. In some examples, one or more reference vectors 204 may be combined, e.g., averaged or otherwise accumulated, to form a reference vector 204. In some implementations, the personal attribute data 110 includes audio data characterizing an utterance spoken by a particular person 202 during an interaction the user 102 is having with the particular person 202, and extracting the reference vector 204 for the particular person 202 includes extracting, from the audio data characterizing the utterance spoken by the particular person 202, the reference vector representing characteristics of a voice of the particular person 202. In other implementations, the personal attribute data 110 includes receiving image data corresponding to a face of a particular person 202 during an interaction the user 102 is having with the particular person 202, and extracting the reference vector 204 for the particular person 202 includes extracting, from the image data characterizing the face of the particular person 202, the reference vector 204 representing facial features of the particular person 202.

In some examples, the device 10 obtains the identity of a particular person 202 by receiving a user input from the user 102 that conveys the identity of the particular person 202. Here, the user 102 provides the user input after the user 102 finishes the interaction with the particular person 202. Additionally or alternatively, the device 10 may obtain the identity of the particular person 202 by receiving audio data characterizing an utterance spoken by the particular person 202 during the interaction the user 102 is having with the particular person 202, performing speech recognition on the audio data to obtain a transcription of the utterance spoken by the particular person 202, and processing the transcription of the utterance to ascertain the identity of the particular person 202. For example, by detecting that the particular person 202 introduces themselves by name (e.g., "Hi, I'm Jane Smith") and extracting their name from the transcript. Moreover, the device 10 may obtain the identity of the particular person 202 by receiving, from another computing device associated with the particular person 202, metadata indicating the identity of the particular user from the another computing device.

In some examples, the user 102 may ask "who is that?" and the device 10 in response captures personal attribute data 110 for the particular person 202 that the user 102 is looking at. When, for example, there are multiple persons shown in image data 110, the person identifier 300 may use aiming clues for the device 10 (e.g., the pointing direction of an AR headset or an eye gaze direction) or eye tracking to identify a particular person 202 being enrolled. In some implementations, the identity 206 of a particular person 202 can be provided after the fact. For example, by asking someone "who was that person I was just speaking to?" and then providing the person's identity 206 to the person identifier 300. In some examples, machine learning can be used to time correlate captured personal attribute data 110 with such a question, and then automatically extract the individual's identity 206 from audio data of the their answer for use in generating or updating the reference vectors 204. Additionally or alternatively, personal attribute data 110 used to enroll a particular person 202 may be obtained from a third-party. For example, the user 102 may use the device 10 to obtain image data from a website, from a program, from an advertisement, or audio data of a recording of a talk, received from another person, etc. In some examples, additional reference vectors 204 may be added over time to a record 202. For example, when an unrecognizable individual 104 is originally identified as matching a particular record 202 based on image data, the person identifier 300 may capture audio data and use the audio data to extract an additional audio-based reference vector 204. In some examples, the person identifier 300 may automatically identify a particular person 202 by, for example, using optical character recognition to obtain the identity 206 from a name tag, caption, etc., or automatic speech recognition of audio of an individual introducing themselves.

Figure 3:
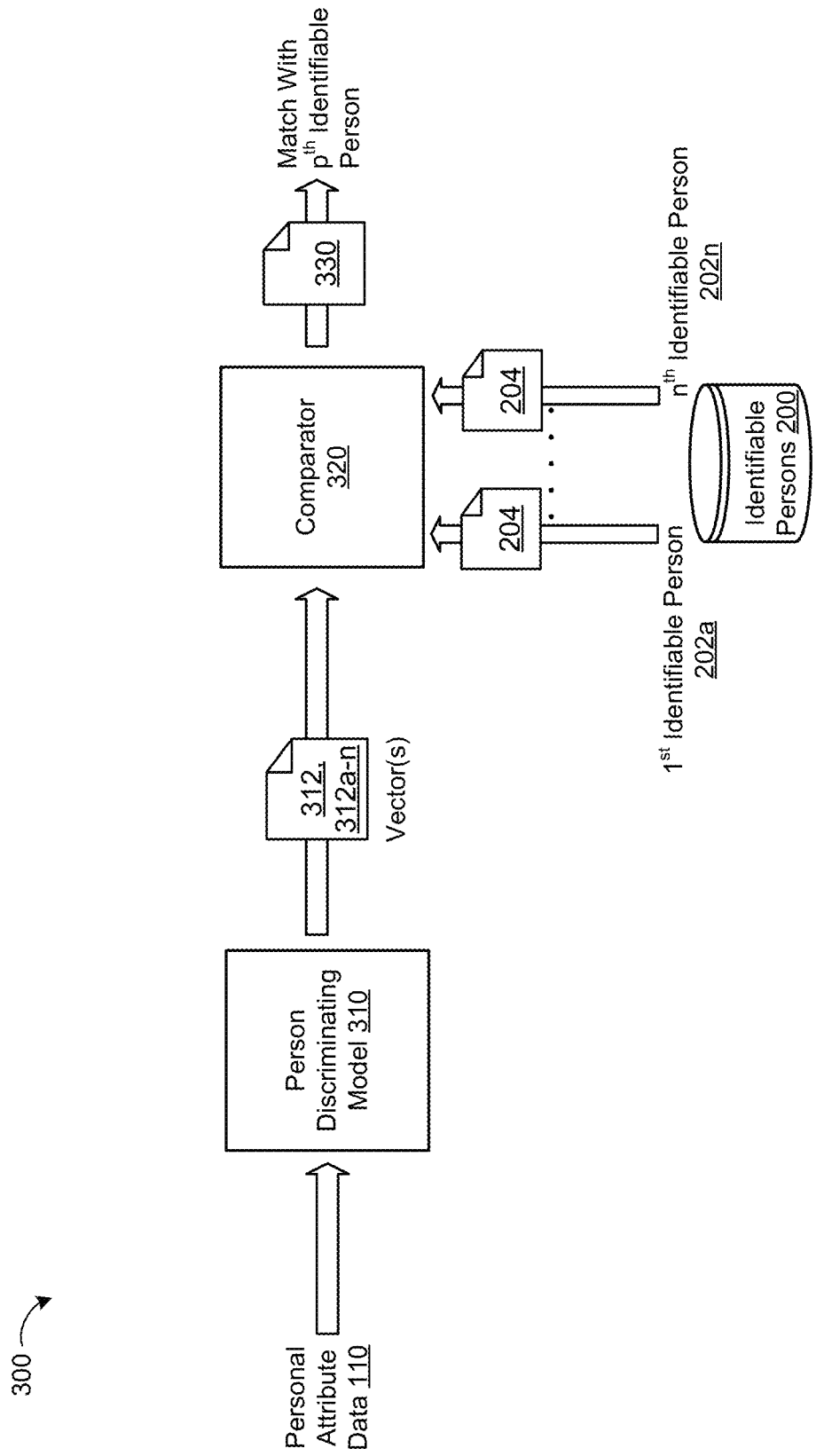
FIG. 3 is a schematic view of an example person identifier.

Referring to FIG. 3, in some examples, the person identifier 300 resolves the identity of an unrecognizable individual 104 by performing a person identification process 300. The person identification process 300 may execute on the data processing hardware 12 of the device 10. The process 300 may also execute on data processing hardware 72 of the remote computing system 70. Here, the person identification process 300 may execute a person discriminating model 310 configured to receive the personal attribute data 110 as input and extract, as output, one or more evaluation vectors 312, 312a-n. The person discriminating model 310 may be a neural network model trained under machine or human supervision to output evaluation vectors 312. Evaluation vectors 312 output by the person discriminating model 310 may include N-dimensional vectors having a value that corresponds to features of the personal attribute data 110. In some examples, the evaluation vectors 312 are d-vectors.

Once the evaluation vector(s) 312 are output from the person discriminating model 310, the person identification process 300 determines whether the extracted evaluation vector(s) 312 match any of the reference vectors 204 stored in the identifiable persons datastore 200 for enrolled persons 202. As described above with reference to FIG. 2, the person discriminating model 310 may generate the reference vectors 204 for the enrolled persons 202 during an enrollment process.

In some implementations, the person identification process 300 uses a comparator 320 that compares the evaluation vector(s) 312 to the respective reference vector(s) 204 associated with each enrolled particular person 202. Here, the comparator 320 may generate a score for the comparison the evaluation vector(s) 312 with the reference vector(s) 204 for each particular person 202 indicating a likelihood that the personal attribute data 110 indicates that the identity of an unrecognizable individual 104 corresponds to the identity of the particular person 202. In some examples, the comparator 320 may compute a respective cosine distance between the evaluation vector(s) 312 and each reference vector 204 as the score. The particular person 202 having the highest score may be identified as the identity of the unrecognizable individual 104. Alternatively, the particular person 202 having the highest score may be identified as the identity of the unrecognizable individual 104 only when the highest score satisfies a threshold. Conversely, when the person identification process 300 determines that the evaluation vector(s) 311 do not sufficiently match any of the enrolled persons 202, the process 300 may identify the unrecognizable individual 104 as unknown.

Figure 4:
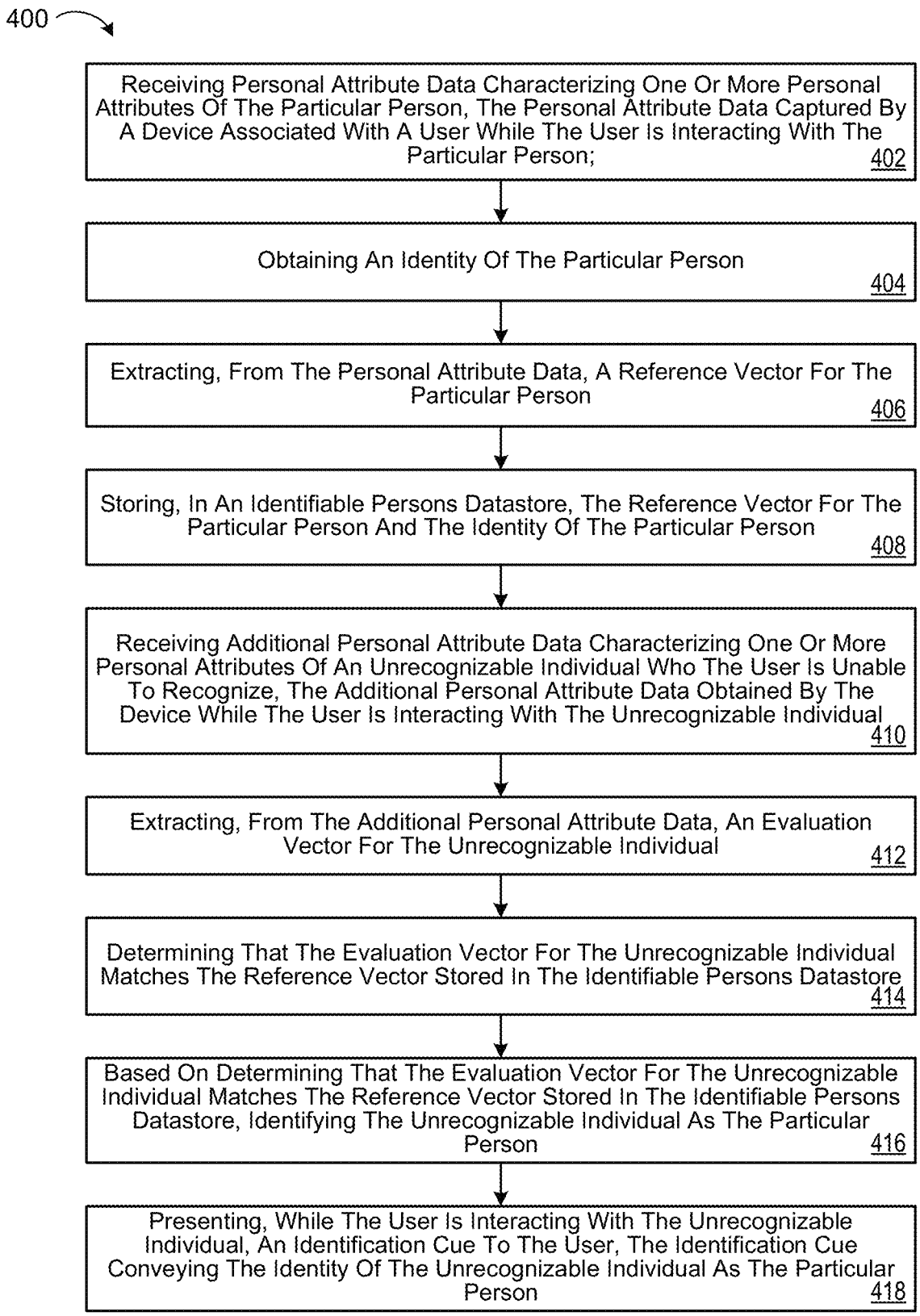
FIG. 4 is a flowchart of an example arrangement of operations for a computer-implemented method for using personal attributes to uniquely identify individuals.

FIG. 4 is a flowchart of an exemplary arrangement of operations for a computer-implemented method 400 for using personal attributes to uniquely identify individuals. The operations may be performed by data processing hardware 510 (e.g., the data processing hardware 12 of the device 10 or the data processing hardware 72 of the remote computing system 70) based on executing instructions stored on memory hardware 520 (e.g., the memory hardware 14 of the device 10 or the memory hardware 74 of the remote computing system 70).

For a particular person 202 being enrolled, the method 400 includes, at operation 402, receiving personal attribute data 110 characterizing one or more personal attributes of the particular person 202, the personal attribute data 110 captured by a device 10 associated with a user 102 while the user 102 is interacting with the particular person 202. At operation 404, the method 400 includes obtaining an identity 206 of the particular person 202. At operation 406, the method 400 includes extracting, from the personal attribute data 202, a reference vector 204 for the particular person 202. The method 400 includes, at operation 408, storing, in an identifiable persons datastore 200, the reference vector 204 for the particular person 202 and the identity 206 of the particular person 202.

For an unrecognizable individual 104, the method 400 includes, at operation 410, receiving additional personal attribute data 110 characterizing one or more personal attributes of an unrecognizable individual 104 who the user 102 is unable to recognize, the additional personal attribute data 110 obtained by the device 10 while the user 102 is interacting with the unrecognizable individual 104. The method 400 includes performing person identification on the additional personal attribute data 110 to identify the unrecognizable individual 104 by, at operation 412, extracting, from the additional personal attribute data 110, an evaluation vector 312 for the unrecognizable individual 104. At operation 414, the method 400 includes determining that the evaluation vector 312 for the unrecognizable individual 104 matches the reference vector 204 stored in the identifiable persons datastore 200. The method 400 includes, at operation 416, based on determining that the evaluation vector 312 for the unrecognizable individual 104 matches the reference vector 204 stored in the identifiable persons datastore 200, identifying the unrecognizable individual 104 as the particular person 202. At operation 418, the method 400 includes presenting, while the user 102 is interacting with the unrecognizable individual 104, an identification cue 120 to the user 102, the identification cue 120 conveying the identity of the unrecognizable individual 104 as the particular person 202.

Figure 5:
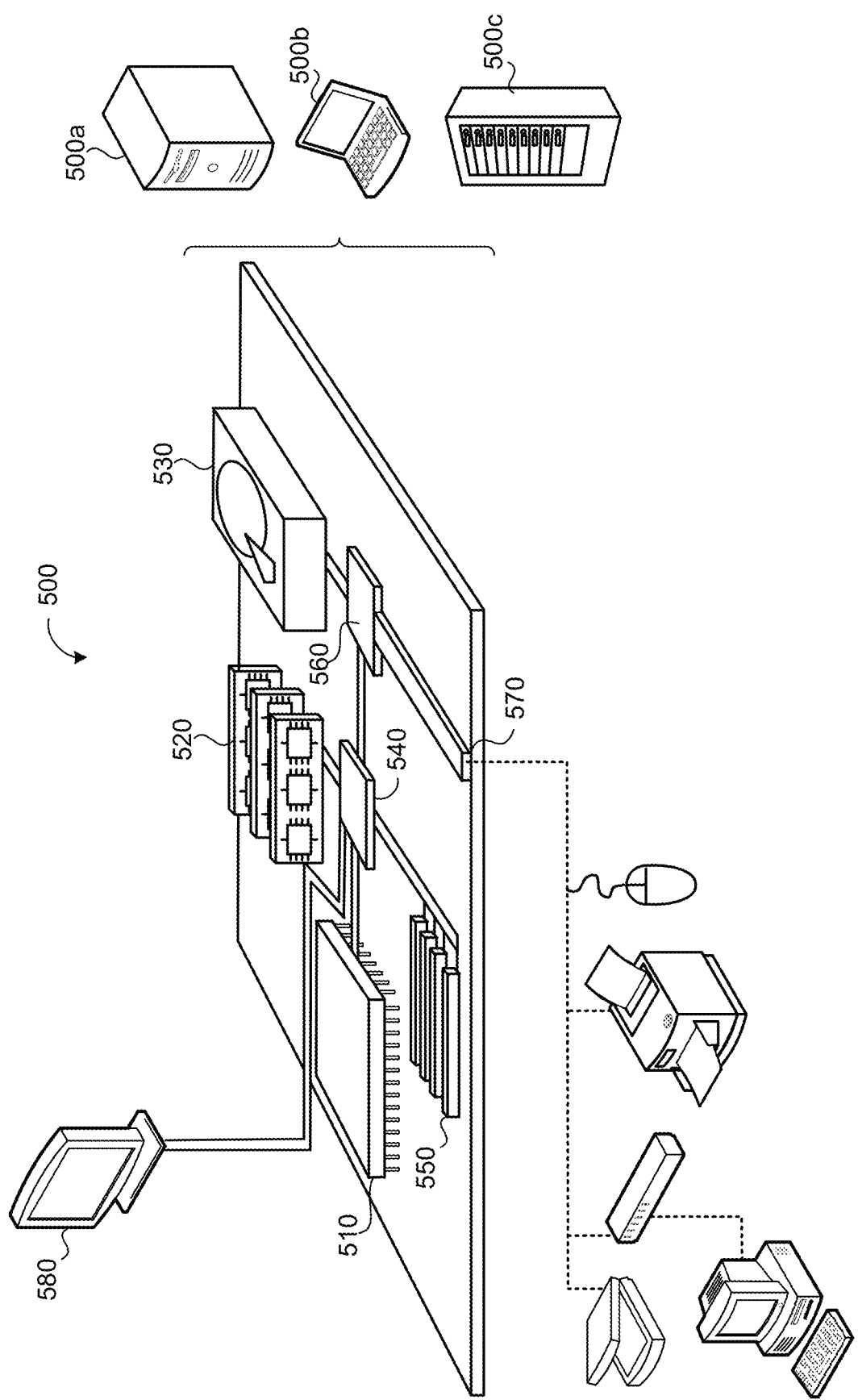
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (i.e., data processing hardware) that can be used to implement the data processing hardware 12 and/or 72, memory 520 (i.e., memory hardware) that can be used to implement the memory hardware 14 and/or 74, a storage device 530 (i.e., memory hardware) that can be used to implement the memory hardware 14 and/or 74, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Furthermore, unless expressly stated to the contrary, "A or B" is intended to refer to any combination of A and B, such as: (1) A alone; (2) B alone; and (3) A and B.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:
   for a particular person:
      receiving personal attribute data characterizing one or more personal attributes of the particular person, the personal attribute data captured by a device associated with a user while the user is interacting with the particular person;
      obtaining an identity of the particular person;
      extracting, from the personal attribute data, a reference vector for the particular person; and
      storing, in an identifiable persons datastore, the reference vector for the particular person and the identity of the particular person;
   receiving additional personal attribute data characterizing one or more personal attributes of an unrecognizable individual who the user is unable to recognize, the additional personal attribute data obtained by the device while the user is interacting with the unrecognizable individual;
   receiving a gesture performed by the user and captured by the device associated with the user while the user is interacting with the unrecognizable individual, the gesture performed by the user indicating that the user is recognize the unrecognizable individual;
   in response to receiving the gesture, performing person identification on the additional personal attribute data to identify the unrecognizable individual by:
      extracting, from the additional personal attribute data, an evaluation vector for the unrecognizable individual;
      determining that the evaluation vector for the unrecognizable individual matches the reference vector stored in the identifiable persons datastore; and based on determining that the evaluation vector for the unrecognizable individual matches the reference vector stored in the identifiable persons datastore, identifying the unrecognizable individual as the particular person; and presenting, while the user is interacting with the unrecognizable individual, an identification cue to the user, the identification cue conveying the identity of the unrecognizable individual as the particular person.

2. The computer-implemented method of claim 1, wherein the personal attribute data comprises at least one of:
audio data characterizing to an utterance spoken by the particular person, the audio data captured by an array of one or more microphones in communication with the device; or
image data characterizing a face of the particular person, the image data captured by an image capture device in communication with the device.

3. The computer-implemented method of claim 1, wherein:
receiving the personal attribute data comprises receiving audio data characterizing an utterance spoken by the particular person during the interaction the user is having with the particular person;
extracting the reference vector for the particular person comprises extracting, from the audio data characterizing the utterance spoken by the particular person, the reference vector representing characteristics of a voice of the particular person;
receiving the additional personal attribute data comprises receiving additional audio data characterizing an utterance spoken by the unrecognizable individual during the interaction the user is having with the unrecognizable individual; and
extracting the evaluation vector for the unrecognizable individual comprises extracting, from the additional audio data corresponding to the utterance spoken by the unrecognizable individual, the evaluation vector representing characteristics of a voice of the unrecognizable individual.

4. The computer-implemented method of claim 1, wherein:
receiving the personal attribute data comprises receiving image data corresponding to a face of the particular person during the interaction the user is having with the particular person;
extracting the reference vector for the particular person comprises extracting, from the image data characterizing the face of the particular person, the reference vector representing facial features of the particular person;
receiving the additional personal attribute data comprises receiving additional image data characterizing a face of the unrecognizable individual during the interaction the user is having with the unrecognizable individual; and
extracting the evaluation vector for the unrecognizable individual comprises extracting, from the additional image data characterizing the face of the unrecognizable individual, the evaluation vector representing facial features of the unrecognizable individual.

5. The computer-implemented method of claim 1, wherein obtaining the identity of the particular person comprises receiving a user input from the user that conveys the identity of the particular person, the user providing the user input after the user finishes the interaction with the particular person.

6. The computer-implemented method of claim 1, wherein obtaining the identity of the particular person comprises:
receiving audio data characterizing an utterance spoken by the particular person during the interaction the user is having with the particular person;
performing speech recognition on the audio data to obtain a transcription of the utterance spoken by the particular person; and
processing the transcription of the utterance to ascertain the identity of the particular person.

7. The computer-implemented method of claim 1, wherein obtaining the identity of the particular person comprises receiving, from another computing device associated with the particular person, metadata indicating the identity of the particular person from the another computing device.

8. The computer-implemented method of claim 1, wherein the gesture performed by the user and captured by the user device comprises at least one of the user raising their eyebrows, closing a fist, or rubbing the device.

9. The computer-implemented method of claim 1, wherein presenting the identification cue to the user comprises providing, for audible output from the device or from an audio output device in communication with the device, an audio message conveying the identity of the unrecognizable individual.

10. The computer-implemented method of claim 1, wherein presenting the identification cue to the user comprises providing, for display on a screen in communication with the device, a textual message conveying the identity of the unrecognizable individual.

11. A system comprising:
data processing hardware; and
memory hardware in communication with the data processing hardware and storing instructions that, when executed on the data processing hardware, cause the data processing hardware to perform operations comprising:
for a particular person:
receiving personal attribute data characterizing one or more personal attributes of the particular person, the personal attribute data captured by a device associated with a user while the user is interacting with the particular person;
obtaining an identity of the particular person;
extracting, from the personal attribute data, a reference vector for the particular person; and
storing, in an identifiable persons datastore, the reference vector for the particular person and the identity of the particular person;
receiving additional personal attribute data characterizing one or more personal attributes of an unrecognizable individual who the user is unable to recognize, the additional personal attribute data obtained by the device while the user is interacting with the unrecognizable individual;
receiving a gesture performed by the user and captured by the device associated with the user while the user is interacting with the unrecognizable individual, the gesture performed by the user indicating that the user is recognize the unrecognizable individual;
in response to receiving the gesture, performing person identification on the additional personal attribute data to identify the unrecognizable individual by:

extracting, from the additional personal attribute data, an evaluation vector for the unrecognizable individual;

determining that the evaluation vector for the unrecognizable individual matches the reference vector stored in the identifiable persons datastore; and based on determining that the evaluation vector for the unrecognizable individual matches the reference vector stored in the identifiable persons datastore, identifying the unrecognizable individual as the particular person; and presenting, while the user is interacting with the unrecognizable individual, an identification cue to the user, the identification cue conveying the identity of the unrecognizable individual as the particular person.

12. The system of claim 11, wherein the personal attribute data comprises at least one of:

audio data characterizing to an utterance spoken by the particular person, the audio data captured by an array of one or more microphones in communication with the device; or image data characterizing a face of the particular person, the image data captured by an image capture device in communication with the device.

13. The system of claim 11, wherein:

receiving the personal attribute data comprises receiving audio data characterizing an utterance spoken by the particular person during the interaction the user is having with the particular person;

extracting the reference vector for the particular person comprises extracting, from the audio data characterizing the utterance spoken by the particular person, the reference vector representing characteristics of a voice of the particular person;

receiving the additional personal attribute data comprises receiving additional audio data characterizing an utterance spoken by the unrecognizable individual during the interaction the user is having with the unrecognizable individual; and extracting the evaluation vector for the unrecognizable individual comprises extracting, from the additional audio data corresponding to the utterance spoken by the unrecognizable individual, the evaluation vector representing characteristics of a voice of the unrecognizable individual.

14. The system of claim 11, wherein:

receiving the personal attribute data comprises receiving image data corresponding to a face of the particular person during the interaction the user is having with the particular person;

extracting the reference vector for the particular person comprises extracting, from the image data characterizing the face of the particular person, the reference vector representing facial features of the particular person;

receiving the additional personal attribute data comprises receiving additional image data characterizing a face of the unrecognizable individual during the interaction the user is having with the unrecognizable individual; and extracting the evaluation vector for the unrecognizable individual comprises extracting, from the additional image data characterizing the face of the unrecognizable individual, the evaluation vector representing facial features of the unrecognizable individual.

15. The system of claim 11, wherein obtaining the identity of the particular person comprises receiving a user input from the user that conveys the identity of the particular person, the user providing the user input after the user finishes the interaction with the particular person.

16. The system of claim 11, wherein obtaining the identity of the particular person comprises:

receiving audio data characterizing an utterance spoken by the particular person during the interaction the user is having with the particular person;

performing speech recognition on the audio data to obtain a transcription of the utterance spoken by the particular person; and processing the transcription of the utterance to ascertain the identity of the particular person.

17. The system of claim 11, wherein obtaining the identity of the particular person comprises receiving, from another computing device associated with the particular person, metadata indicating the identity of the particular person from the another computing device.

18. The system of claim 11, wherein the gesture performed by the user and captured by the user device comprises at least one of the user raising their eyebrows, closing a fist, or rubbing the device.

19. The system of claim 11, wherein presenting the identification cue to the user comprises providing, for audible output from the device or from an audio output device in communication with the device, an audio message conveying the identity of the unrecognizable individual.

20. The system of claim 11, wherein presenting the identification cue to the user comprises providing, for display on a screen in communication with the device, a textual message conveying the identity of the unrecognizable individual.

* * * * *